Sept. 13, 1960
J. JURCHECK
2,952,322
DRY LAND PLOW
Filed Aug. 8, 1955
3 Sheets-Sheet 1
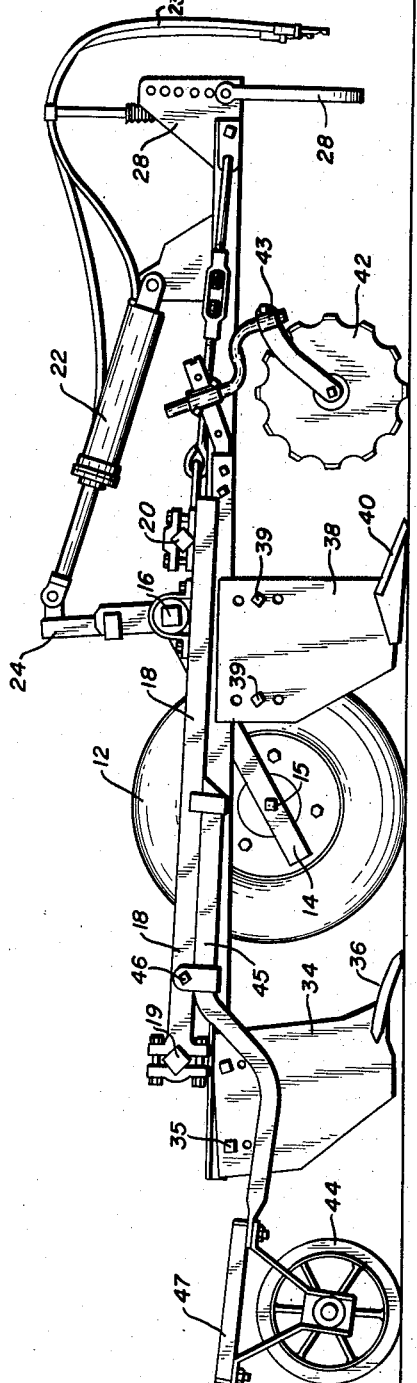
FIG.-1
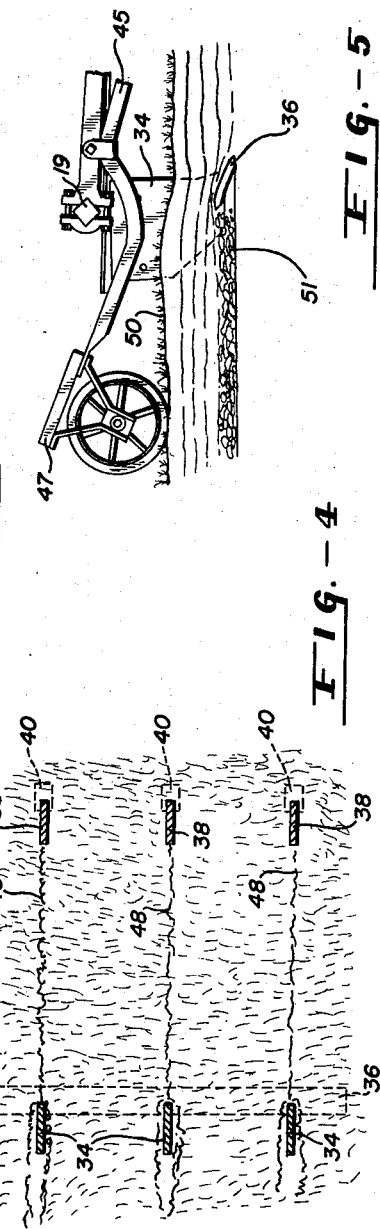
FIG.-5
FIG.-4
INVENTOR.
John Jurcheck
BY
ATTORNEYS

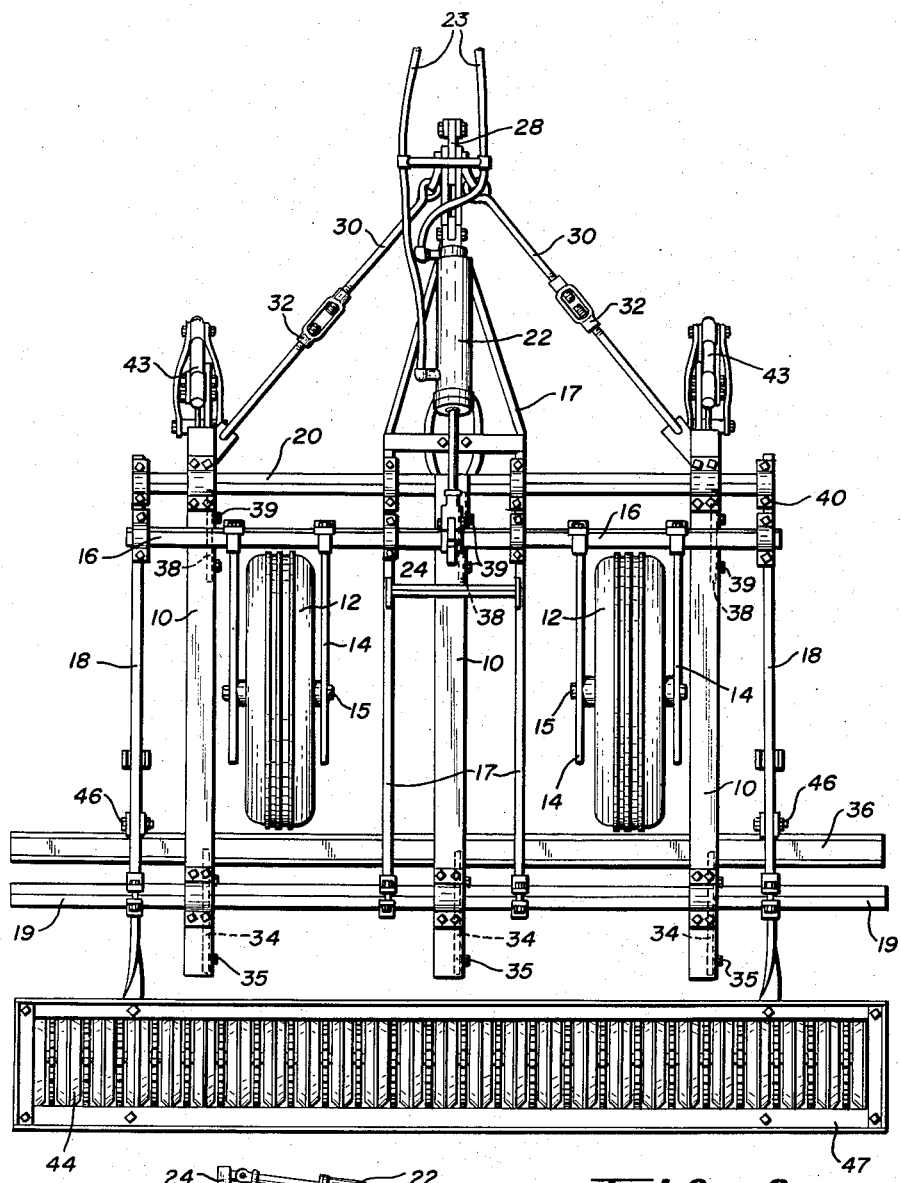
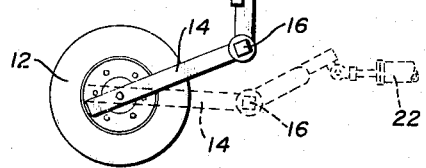
FIG.-2
FIG.-3
INVENTOR.
John Jurcheck
ATTORNEYS

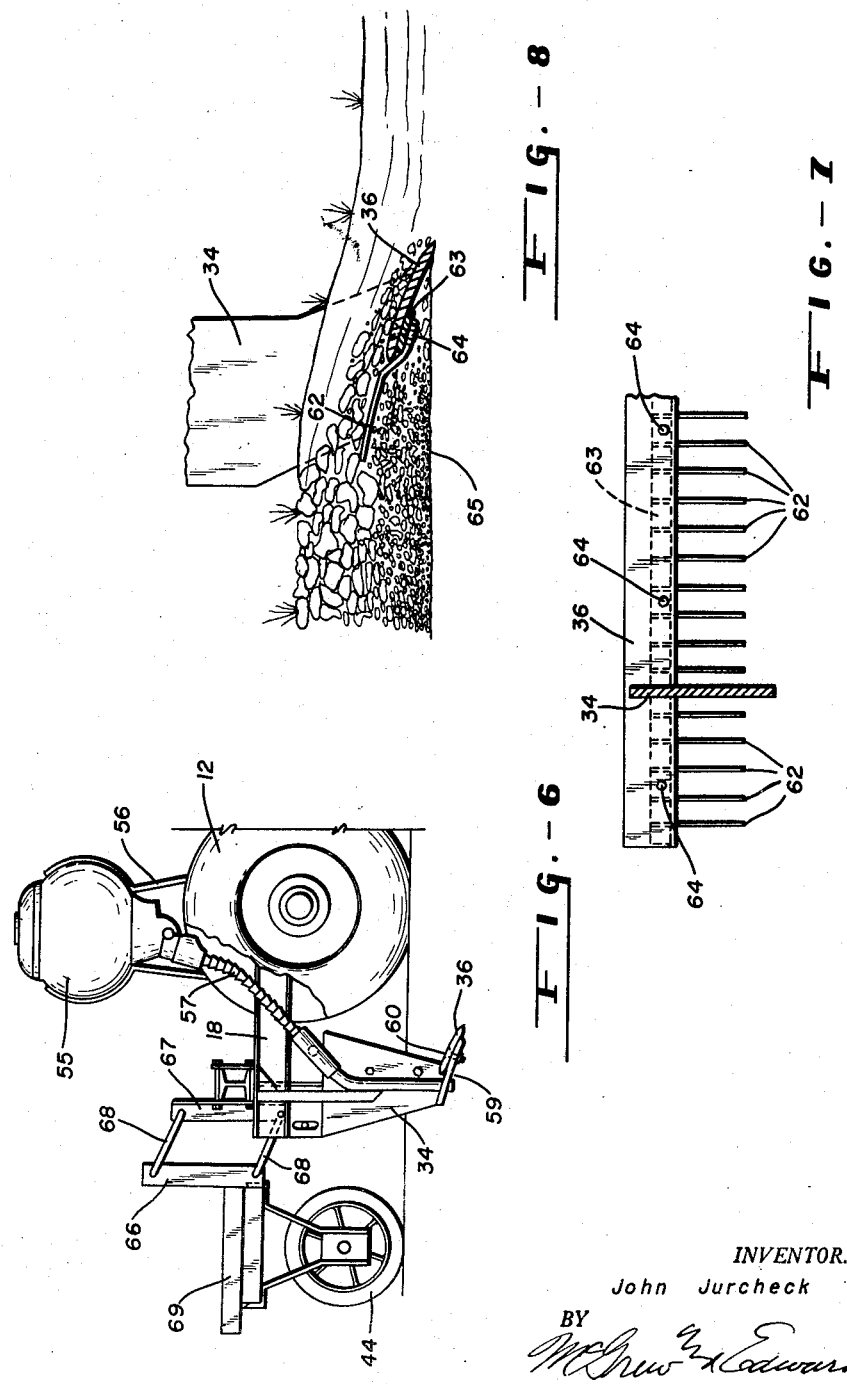

United States Patent Office 2,952,322
Patented Sept. 13, 1960

2,952,322

DRY LAND PLOW

John Jurcheck, Dacona, Colo., assignor to Silver Corporation, Denver, Colo., a corporation of Colorado Filed Aug. 8, 1955, Ser. No. 527,008

5 Claims. (Cl. 172—151)

This invention relates to plows, and more particularly to plows which till sub-surface soil only, leaving the top soil and stubble substantially intact, with the stubble and trash adequately anchored. Specifically, the invention relates to plows which are especially useful in dry land farming, in which sub-soil is effectively cultivated with a minimum of surface tilling whereby a major portion of the surface turf is maintained substantially intact.

Conventional plowing equipment turns up sub-soil and turns under top soil so that the net effect is a new surface exposed. The old surface containing the turf and stubble is turned under. In areas of light annual precipitation, the wind and sun quickly dry out the newly turned soil, depleting the land not only of its surface, but, also, its sub-surface moisture. Sustained periods of high winds and little moisture are extremely detrimental to conventional furrow plowing, for once the turf and the top soil are turned under, vast areas of land become moisture depleted and winds blow away the soil creating the well-known dust storms. While contour, stubble mulch, strip and similar types of plowing have been found to be an improvement, they do not provide a completely satisfactory answer since they, also, turn up sub-soil and permit the land to quickly dry out, or the stubble is not sufficiently anchored so that it blows away. Also, sand and dust carried by the wind may be deposited in and fill the furrows of the plowing.

According to the present invention, there is provided a plow which tills or cultivates sub-soil sufficient for agricultural requirements, and which leaves a major portion of the surface soil intact and the stubble and trash upright and adequately anchored to prevent the soil from blowing away. The device may be used to plow on a once over system, twice over system, or as many times over as is required, without substantially turning up sub-soil. Since the plow does not leave furrows as other types of plows, it provides a complete cultivation operation in one pass over the field, leaving the field relatively smooth. The plow cultivates the sub-soil, leaving stubble and trash adequately anchored so that they will not blow away, and they are left in substantially upright position so as to hold snow from blowing. The plowing, also, aids in retaining sub-surface moisture. The plow may be used to plow deep on a once over pass, after a harvest, and then for the second time as a shallow cultivation before planting and at an angle to the direction of the first plowing, whereby the plow not only effectively cultivates the ground, but provides an effective weeding since it shears the roots of the weeds. The second time over may substantially prepare the ground for planting. The plow is, furthermore, ideally suited for drilling or planting seeds, or for introducing fluid fertilizers into the soil. Liquid or gaseous fertilizers may be introduced into the ground during the plowing, and since the ground is not turned over, a major portion of the fertilizer will be sealed in the ground. For example, anhydrous ammonia may be introduced into the ground during the plowing, and little or none of the ammonia will escape from the sub-soil cultivation. Seed planting is effectively performed by seeding during the sub-surface plowing. The seeds are scattered in a relatively wide row, but the seeds are deposited on a relatively hard surface and covered with loose soil which is highly beneficial to seed germination. The blade of the plow may be tilted to various angles of attack in accordance with the particular conditions so as to heave the weed roots as an aid in killing the weeds. By adjusting the depth of cultivation of the plow on the second time over, or any subsequent plowing where required, and the speed at which the plow is pulled, the plow produces an efficient weeding effect.

In general, the plow of the present invention comprises a series of chisels secured to thin standards for cutting spaced, very narrow slices in the soil with substantially no furrowing. The chisels are spaced laterally of the line of plowing, and may run at various depths in relation to the depth of the cultivating blade so as to present a single, well-defined plow depth pattern, and to provide a series of grooves for better moisture penetration of the sub-soil. Most plowing methods use a single depth of furrow year after year causing a hard, well-defined sub-surface which is difficult for moisture to penetrate. The chisels are adjustable to provide grooves in the sub-surface. A narrow, elongated plow blade is secured to standards spaced laterally of the line of plowing and each in position to register in the cut behind the chisel standards. The blade is positioned substantially perpendicularly to its line of travel and is adapted to be pulled under ground at a predetermined depth to cultivate the sub-soil. The blade is arranged to be tilted to various angles of attack for changing the "heave" of the soil. The chisels, in effect, cut passages for the standards of the blade, so that stubble and turf does not build up on the standards of the blade. For plowing unplowed land or stubble, a colter is attached to the beam in front of the standards of the chisels for cutting the sward, and thereby prevent a build-up of turf and plants on the various standards of the device. In one application, a plurality of small tines are arranged to be attached to the plow blade extending laterally therefrom along the trailing edge of the blade. The tines are spaced apart a sufficient distance so that lumps of soil elevated over the plow pass up over the tines while the "fines" are sifted through the tines. The lumps and clods are heaved up and the fine particles are sifted downwardly. The large lumps will not blow away in the wind, and they afford considerable protection for the fines below. The tines, also, assist in killing stubborn weeds by breaking up the root structure. A series of seeding drills may, also, be attached to the blade in position to dispense seeds behind the cutting edge of the blade.

Included among the objects and advantages of the present invention is a plow adapted to cultivate or till the sub-soil and maintain substantially intact the surface soil and maintain the stubble and trash upright and adequately anchored for holding the soil from blowing away. The upright stubble holds snow from blowing away, increasing moisture levels of the soil. The plow of the invention, also, provides complete tillage of the sub-soil along the lateral width of the plow. The plow of the invention provides for plowing and leaving a substantially smooth surface in one operation. The plow provides means for twice over plowing the same field without intermediate treatment of the field to prepare for the second plowing. By replowing a field at a shallow depth, the plow effectively weeds the field, and by changing the angle of attack of the plow blade, the heaving effect may be controlled to suit the particular conditions encountered. The device provides means for tilling land during dry seasons, substantially without danger of losing moisture or losing the top soil by wind erosion. Liquid and gaseous fertilizers may be efficiently injected into the ground and effectively sealed therein so as to prevent loss of fertilizer to the atmosphere. Seeding drills may be utilized with the plow blade to provide means for plowing and simultaneously seeding. The seeding is performed in an effective way to promote optimum germination. Novel tine attachments are provided for the blade for producing a rearranged sub-soil pattern which is resistant to blowing and erosion, and to aid in weeding.

These and other objects and advantages of the invention may be readily ascertained by referring to the following description and illustrations, in which:

Fig. 1 is a side, elevational view of a sub-surface plow according to the present invention;

Fig. 2 is a top plan view of a sub-surface plow;

Fig. 3 is a detail view of the raising and lowering mechanism for the plow frame;

Fig. 4 is a diagrammatic view of the chisels in the sub-surface plow illustrating the relation of the chisels to the expander of the sub-surface plow;

Fig. 5 is a diagrammatic view of the plow with the present invention in operation in cultivating the sub-surface soil, while maintaining the surface soil substantially intact;

Fig. 6 is a partial side view of a plow according to the invention with an attached system of seed drills;

Fig. 7 is a partial top plane detail of a modified plow blade according to the invention; and Fig. 8 is a side view detail of the modified plow blade of the invention in action during plowing.

The device illustrated includes a wheeled frame for supporting a sub-surface plow mechanism. The frame comprises a series of substantially parallel frame members 10 having an inner frame 17 and an outer frame 18 secured thereto. The inner frame 17 is secured to the outer frame 18 and to frame 10 by means of a rear cross bar 19, each of the frame members being relatively rigidly secured to the rear cross bar 19. Likewise, the inner frame 17 and the outer frame 18 and the parallel frame members 10 are secured together by means of a front cross bar 20 to which each of the frame members is relatively rigidly secured. The completed frame is supported on wheels 12 which are mounted on movable supports to permit raising and lowering of the frame in relation to the wheels. The wheels are secured from their axles 15 to a journal control shaft 16 by means of wheel support arms 14. The control shaft 16 is journalled for rotation through the inner and outer frames, and a hydraulic cylinder 22 secured to a control lever 24 turns the journalled control shaft 16 to change the angle of the support arms 14, thereby raising and lowering the frame in relation to the axle of the wheels. Hydraulic lines 23 supply actuating fluid from an auxiliary source (not shown) on the tractor to the cylinder 22. Forward movement of the lever arm 24 rotates the control shaft 16, in effect raising wheels 12, but since the wheels normally ride on the ground, the frame will be lowered in relation to the axle of the wheel, forcing the plows deeper into the ground. The reverse motion lifts the frame in relation to the axle of the wheel, thereby raising the plow and ultimately pulling it clear of the ground. The cross bar 20 contacts the lever 24 in lowermost position and provides stop means on the frame for determining the lowest depth of cut of the mold board. The frame is connected by means of a yoke 28 to a tractor for motivating power. Stabilizer arms 30, having adjusting turn buckles 32, are secured to the outer edges of the frame for holding the plow in correct alignment in relation to its line of travel.

Connected to the rear portion of each of the three main frame members are plow standards 34, secured by means of bolts 35 or the like, to the frame members. The standards are relatively thin pieces of plate metal stock cut to provide a range of depths in which the plow is to be used. The maximum depth of plowing may be determined by the size of the standards. The sub-surface plow comprises an elongated, relatively thin plate or blade 36 which is secured to the standards, and is normally mounted with its width positioned at an angle to the line of travel of the plate. The angle of attack of the blade 36 may be changed so as to vary its heaving characteristics as it passes through the soil. The plate 36 extends a distance laterally beyond each of the end standards, and the length of the plate, in general, determines the width of the plowing path. The standards are adjustable vertically to set the depth of plowing, and they are tiltable to provide a different angle for the plow blade. The amount of heaving is determined by the angle of attack of the plow blade. While the hydraulic cylinder provides means for controlling the depth of the plow within a relatively narrow range, the vertical adjustment of the plow standards provides another depth adjustment. The blade 36 is an arcuate member, sharpened on both edges so as to be reversible and readily changeable. This permits the blade to be changed during a plowing day without the necessity of resharpening during actual plowing.

Secured to the front end of each of the three main frame members are other downwardly depending standards 38 set in the line of travel with, but ahead of the three plow standards 34. Mounted at an angle on the bottom of each of the standards 38 is a narrow chisel 40. The standards 38 are secured to the frame members by means of bolts 39, and are vertically adjustable for adjusting the depth of penetration of the chisels in the earth. In normal use, the chisels 40 are set to various depths in relation to the cutting edge of the plow plate 36, to provide a set depth of plowing pattern. The chisels and their supporting standards cut a substantially non-turning, narrow furrow, to accommodate the standards of the plow which follows in the wake of the chisels. This non-turning furrow provides a loose slice or path through the earth through which the plow standards may cleanly pass without substantial interference and without accumulating stubble and debris on the plow standards, and to subsequently readily admit moisture to the subsoil. In unplowed fields or in very heavy stubble, a colter 42 secured by means of a frame 43 to the front end of the three main frame members 10 may be used to provide for cutting or slicing the earth and plant growth to permit clean travel of the chisel standards 38. The colters 42 cut or slice the earth and adhering stubble and plants so that such debris will not pile or build up on the chisel standards as they are pulled through the ground.

An agricultural roller 44, having a pivoted frame 45 secured by means of a single pivot bolt 46 to each member 18 of the outer frame, provides means for packing or mulching the earth after the plow has passed. The roller 44 has a frame 47 thereon for carrying weights to vary the packing pressure on the earth.

Fig. 3 illustrates the action of raising and lowering the frame by means of the wheels 12. In non-plowing or raised position, the lever arm 24 is substantially upright, maintaining the wheel support arms 14 at an acute angle to the ground. In this position, the journal control shaft 16, which is secured to the frame, is carried in uppermost position and the frame is likewise carried in uppermost position. By moving the control arm lever 24 forward, rotating the journal control shaft 16 to the position indicated by the dotted lines, the control shaft rotates, changing the angle of the arms 14 and lowering shaft 16, carrying with it the plow frame. This action controls the depth of penetration of the plow into the ground, and a reverse action raises the plow therefrom.

In Fig. 4 there is illustrated the relation of the plow standards to the chisel standards as the plow passes through the ground. The chisel standards 38 cut a very narrow unturned furrow or slice 48, without disturbing the remainder of the ground. The chisels 40 provide a minor digging or grooving action at the bottom of the standards 38, and partially prepare the ground to receive the plow 36. The standards 34 for the plate plow 36 are aligned with the chisel standards 38, and follow in the unturned furrow 48. The plow 36 rides generally horizontally underground, cultivating the sub-soil, while substantially the only surface disturbance is in the three narrow unturned furrows 48. There is some heaving of the top soil, and the amount of heaving is generally determined by the depth of the plow and the angle of attack of the blade. The heaved soil is tamped by the roller 44.

The action of the plow on the sub-soil is diagrammatically illustrated in Fig. 5, wherein the plow standard 34 cuts through the ground in its unturned furrow, and the plow plate cultivates the sub-soil. The plow plate 36 is tilted at an angle to its line of travel, and as it passes through the sub-soil it cuts a swath as thick as the effective projected width of the plow, raising the soil 50. The sub-soil 51 is broken up and cultivated as it passes over the plow. In this manner the sub-soil is loosened and cultivated and the upper soil is loosened, but the surface of the soil is substantially undisturbed, and the stubble is maintained upright and adequately anchored so it will not blow away. The roller 44 tamps down the dirt and the sod, and, also, it breaks down the stubble to some extent.

On the "second time over" plowing with the plow of the present invention, an effective job of weeding may be performed by setting the plow plate shallower than the deep plowing of the first time over, or by setting the blade at a steeper angle and running at higher speed, or combinations of the same. During this second time over, the soil is heaved more than during the first time over as the plow passes beneath it shearing the deep weed roots, heaving the weeds and exposing some of the roots to the atmosphere, thus killing the weeds. The stubble, which has shallower, matted roots, is not thrown up during this action so that the sod remains substantially intact, and the stubble remains anchored.

Since the plow does not turn over and expose the subsoil, the power required for pulling the plow is surprisingly low. Due to the low power requirements for pulling the plow, the speed of pulling the plow may be increased and the rate of plowing may be increased over conventional type plows. One of the smaller types of farm tractors is normally sufficient to pull a nine foot plow at a reasonably high rate of plowing. The power requirements may be somewhat greater, however, on the first pass and in unplowed fields, but even in virgin fields containing rocks, heavy plant growth, etc., the power requirement is exceedingly low in relation to the width of the swath cut.

The plow provides an exceptionally efficient method of introducing fluid and especially gaseous fertilizers, such as anhydrous ammonia. The action of the plow, which produces a minimum disturbance of the top soil, provides means for introducing the fertilizer into the soil during the plowing, with little loss of the fertilizer to the atmosphere. For example, a tank of anhydrous ammonia may be carried by the plow and feed tubes extended downwardly in back of the standards so that fertilizer is spread along the back of the plow blade. The ammonia is dispensed as the plow passes through the ground. Since the operation does not turn up soil, the ammonia is sealed in the ground. Having only three narrow cuts in the soil and a non-turning soil cultivation reduces loss of fertilizer to the minimum.

In the device illustrated in Fig. 6, a seeding drill is shown attached to the plow. A grain box 55 is mounted on supports 56 above the frame, feed conduits 57 extend from the box 55 to a nozzle 58 secured to the back or trailing edge of the blade 36. The nozzles are secured to plates 59 which are fastened by bolts 60 to the blade. The grain box 55 may be a standard box, such as are available on the open market, and the drive for the box may be taken off the axle of the wheel.

The seeds are introduced into the space behind the blade where they are scattered laterally. This lateral scattering makes rather broad rows of crops. As the blade cuts the sub-soil, it leaves a hard smooth base with loose soil above it. The seeds are deposited on the hard base and are covered with the loose soil, which is very effective in producing optimum germination of the seeds.

The box 55 may be replaced with a tank, and liquid conduits may be used to feed liquid or gaseous fertilizers in the space behind the blade. Any fluid injected into the sub-soil is effectively sealed in, producing optimum conditions for the addition. Also, since the fluid is introduced into the space behind the blade, it is spread laterally across the blade and is not injected in narrow rows.

The modified blade of Figs. 7 and 8 includes a series of tines 62 which are secured to the blade by means of plates 63 and bolts 64. The tines are extended laterally away from the blade 36 from its trailing edge, and the tines are shaped so as to substantially continue the curvature blade. In other words, each tine is so shaped that there is no substantial change in the curvature of the device in a profile section, as is shown in Fig. 8. The tines may be spaced at various distances depending on the soil in which it is used; usually the distance is 2–4 inches apart. For dry, western soil, the tines are preferably spaced about 3 inches apart.

The tines 62 more or less sift the soil passing over the blade 36, so that the fine soil falls to hard surface 65, which is produced when the blade passes through the subsoil, and larger lumps are heaved to the top. This is a very valuable feature in arid areas, since the large lumps tend to cut down erosion due to wind, water, etc., and tend to hold snow in the field. The fine soil, also, provides a better covering for seeds which may have been sown during the plowing process.

The packer or mulcher 44, Fig. 6 is provided with a parallel bar hitch, which keeps the packer vertical during operation. In this case a vertical mount 66 secured to the packer frame is interconnected to a vertical mount 67 secured to the plow by means of a pair of connecting rods 68 pivotally mounted in the ends of supports. Generally, a pair of connecting rods is sufficient for each end of the packer. With this arrangement, the packer will be substantially vertical at all times, and any load in weight box 69 will be directly down on the packer.

The plow with attached roller provides a complete operation for plowing and smoothing. Since the surface is relatively undisturbed, the ground does not have to be dragged to break lumps and smooth out the plow furrows. The rollers, also, tamps the soil, tending to level the soil. With the "twice over" system, the ground is plowed, weeded, and smoothed.

While the invention has been described with reference to specific device, there is no intent to limit the invention to the details so presented, except as set forth in the following claims.

I claim:

1. A subsurface plow for cultivating subsoil and leaving the surface including stubble substantially intact, comprising a sectioned frame arranged for attachment to a prime mover, one portion of said frame being pivotally mounted on the axles of a pair of ground supported wheels, means mounted on the frame and interconnected with the pivotal attachment to said wheels for moving said frame from an upper to a lower position at a predetermined height above ground level, a plurality of colters mounted adjacent the front end of said frame and spaced normally to the forward direction of its movement, a first plurality of downwardly depending standards mounted on said frame with each mounted on a rigid frame section behind and in travel alignment with one of said colters, a narrow chisel supported from each of the standards whereby a narrow cut may be made in the slice formed by each said colter in operable position, a second plurality of downwardly depending standards mounted on the frame rigidly behind said chisel standards and each in travel alignment with one of first said standards, a narrow, elongated mold board secured in substantially horizontal position to each of said second standards and extending laterally beyond the outermost limits of said standards, said mold board being mounted with its major axis substantially perpendicular to the line of travel of said frame and arranged to cultivate a wide subsurface swath without turning surface soil, a control lever interconnected with said sectioned frame and said means for moving said frame upwardly and downwardly in relation to the pivot point on said wheels to thereby control the depth of cut of the mold board, and stop means on the frame for determining the lowest depth cut of said mold board.

2. A device according to claim 1 in which the control lever is interconnected with a hydraulic power means for moving said frame from an upper to a lower operative position.

3. A device according to claim 1 in which the colters are arranged to be moved with said frame from an upper position above the ground level to an operable position for slicing stubble and said mold board is arranged to be moved with the frame from an upper position above the ground to an operable position substantially below ground level.

4. A subsurface plow for cultivating subsoil and leaving the surface including stubble substantially intact, comprising a sectioned frame arranged for attachment to a prime mover, one portion of said frame being pivotally mounted on the axles of a pair of ground supported wheels, means mounted on the frame and interconnected with the pivotal attachment to said wheels for moving said frame from an upper to a lower position at a predetermined height above ground level, a series of three colters mounted adjacent the front end of said frame and spaced normally to the forward direction of its movement, a first series of three downwardly depending standards mounted on said frame with each mounted on a rigid frame section behind and in travel alignment with one of said colters, a narrow chisel supported from each of the standards whereby a narrow cut may be made in the slice formed by each said colter in operable position, a second series of three downwardly depending standards mounted on the frame rigidly behind said chisel standards and each in travel alignment with one of said first standards, a narrow, elongated mold board secured in substantially horizontal position to each of said second standards and extending laterally beyond the outermost limits of said standards, said mold board being mounted with its major axis substantially perpendicular to the line of travel of said frame and arranged to cultivate a wide subsurface swath without turning surface soil, a control lever interconnected with said sectioned frame and said means for moving said frame upwardly and downwardly in relation to the pivot point on the wheels to thereby control the depth of cut of the mold board, and stop means on the frame for determining the lowest depth cut of said mold board.

5. A subsurface plow for cultivating subsoil and leaving the surface including stubble substantially intact, comprising a sectioned frame arranged for attachment to a prime mover, one portion of said frame being pivotally mounted on the axles of a pair of ground supported wheels, means mounted on the frame and interconnected with the pivotal attachment to said wheels for moving said frame from an upper to a lower position at a predetermined height above ground level, a series of three colters mounted adjacent the front end of said frame and spaced normally to the forward direction of its movement, a first series of three downwardly depending standards mounted on said frame with each mounted on a rigid frame section behind and in travel alignment with one of said colters, a narrow chisel supported from each of the standards whereby a narrow cut may be made in the slice formed by each said colter in operable position, a second series of three downwardly depending standards mounted on the frame rigidly behind said chisel standards and each in travel alignment with one of said first standards, a narrow, elongated mold board secured in substantially horizontal position to each of said second standards and extending laterally beyond the outermost limits of said standards, said mold board being mounted with its major axis substantially perpendicular to the line of travel of said frame and arranged to cultivate a wide subsurface swath without turning surface soil, a control lever interconnected with said sectioned frame and said means for moving said frame upwardly and downwardly in relation to the pivot point on the wheels to thereby control the depth of cut of the mold board, and a roller pivotally mounted on the frame following the mold board in position to tamp heaved soil on shallow cultivation.

References Cited in the file of this patent

UNITED STATES PATENTS

| | | |
|---|---|---|
| 361,257 | Beckwith | Apr. 19, 1887 |
| 680,248 | Haussmann | Aug. 13, 1901 |
| 792,832 | Lampton | June 20, 1905 |
| 1,136,172 | Scott | Apr. 20, 1915 |
| 1,137,646 | McDowell | Apr. 27, 1915 |
| 1,247,744 | Trimble | Nov. 27, 1917 |
| 1,287,291 | Gordon | Dec. 10, 1918 |
| 1,362,155 | Towner | Dec. 14, 1920 |
| 1,518,036 | Wilkinson | Dec. 2, 1924 |
| 2,234,351 | Perosa | Mar. 11, 1941 |
| 2,323,412 | Noble | July 6, 1943 |
| 2,345,702 | Noble | Apr. 4, 1944 |
| 2,641,983 | Crum | June 16, 1953 |
| 2,739,549 | Taylor | Mar. 27, 1956 |

FOREIGN PATENTS

| | | |
|---|---|---|
| 243,148 | Italy | Feb. 10, 1926 |